United States Patent [19]

Nelson

[11] E Patent Number: Re. 33,334

[45] Reissued Date of Patent: Sep. 18, 1990

[54] VEHICLE WASH AND DRYER

[75] Inventor: James A. Nelson, Des Moines, Iowa

[73] Assignee: Ryko Manufacturing Company, Grimes, Iowa

[21] Appl. No.: 259,339

[22] Filed: Oct. 18, 1988

Related U.S. Patent Documents

Reissue of:

[64] Patent No.: 4,685,169
Issued: Aug. 11, 1987
Appl. No.: 769,666
Filed: Aug. 26, 1985

[51] Int. Cl.[5] ..... B60S 3/06

[52] U.S. Cl. ..... 15/302; 15/312.1; 15/316.1

[58] Field of Search ..... 15/302, 312 R, 316 R, 15/379, 405; 34/243 C

[56] References Cited

U.S. PATENT DOCUMENTS

| | | | |
|---|---|---|---|
| 2,637,873 | 5/1953 | Berezny | 15/379 X |
| 3,304,570 | 2/1967 | Seress et al. | 15/312 R |
| 3,431,580 | 3/1969 | Cirino et al. | 15/302 |
| 3,525,117 | 8/1970 | Gleaton | 15/312 R |
| 3,571,840 | 3/1971 | Gleaton et al. | 15/312 R |
| 3,755,844 | 9/1973 | Ennis | 15/21 D |
| 3,783,466 | 1/1974 | Bernardi | 15/21 E |
| 3,798,696 | 3/1974 | Cirino | 15/21 E |
| 4,335,526 | 6/1972 | Smith | 34/229 |
| 4,393,602 | 7/1983 | Smith | 34/34 |

OTHER PUBLICATIONS

"Saber Dryer-Dry Cars Without Follower Nozzles" Copyright 1984, by Car Care Corporation (Brochure).

*Primary Examiner*—Chris K. Moore
*Attorney, Agent, or Firm*—Allegretti & Witcoff, Ltd.

[57] ABSTRACT

An apparatus for both washing and drying an automotive vehicle. The apparatus includes a track gantry that moves along the track and over the vehicle. Water outlets and brushes are on the gantry to wash the car. The apparatus further includes a blower, nozzle, and oscillator. The blower, also mounted on the gantry, expels air onto the vehicle. The nozzle, positioned on the blower, defines an orientation and directs the air from the blower substantially parallel to the orientation. The oscillator periodically changes the orientation of the nozzle and the direction of the air from the blower.

9 Claims, 3 Drawing Sheets

VEHICLE WASH AND DRYER

Matter enclosed in heavy brackets [ ] appears in the original patent but forms no part of this reissue specification; matter printed in italics indicates the additions made by reissue.

BACKGROUND OF THE INVENTION

The present invention relates generally to vehicle washers and more particularly to an automatic machine that both washes and dries an automotive vehicle. Frequently vehicle washers include a pair of tracks and a gantry. The gantry rides along the tracks and includes a series of rotating brushes and water outlets.

A vehicle may be driven between the two tracks and stopped. The brushes and water from the outlets may then wash the vehicle as the gantry rides along the tracks.

After such washing, water may be removed from the surface of the vehicle. Otherwise, the water may evaporate, leaving sedimentary deposits on the vehicle. Alternatively, if the vehicle is driven in cold weather, the water on the vehicle may freeze, preventing the doors, locks, and windows from operating.

In order to automatically dry off the vehicle, a separate air blower assembly may be erected, for example, near the ends of the tracks. Thus, when the washing is completed, the vehicle may be driven away from the tracks and through the separate blower assembly.

Unfortunately, drivers frequently tend to move their vehicle past the blower assembly at an improper rate of speed. Many drivers may move past the blowers too quickly, thus preventing the blowers from fully drying the vehicle. Others may drive past too slowly, wasting time and causing the blowers to waste energy.

Moreover, the addition of a "stand alone" dryer next to the tracks and gantry adds significantly to the floor space necessary to hold the wash and dryer device. Furthermore, such separate blower assemblies are relatively large and complex structures, which are expensive to build and maintain.

Other systems may incorporate drying blowers mounted on the gantry. Such devices, however, typically include extensive baffling arrangements to direct air from the blower to all exterior surfaces of the the car.

Furthermore, some systems use complex mechanical assemblies to move the baffling in and out from the gantry. Consequently, the baffling may closely follow the contour of the vehicle as the gantry follows its path. The mechanical assemblies to move the baffling are complex, however, and subject to breakdown. Moreover, both the vehicle and baffling may be seriously damaged if the mechanical assembly malfunctions and fails to retract the baffling at an appropriate time as the gantry moves over the vehicle.

Other systems may mount the baffling and even the blower near the area reserved for the vehicle to be washed. As a result, the size of the vehicle that the gantry can accommodate is reduced. In addition, there is a significant danger the the baffling or blower will scrape or impact the vehicle as the vehicle is driven under the gantry or as the gantry moves over the vehicle. Such a collision could damage both the vehicle and blower assembly.

Finally, many other systems use three or more blowers to dry the vehicle thoroughly. The use of so many blowers, however, makes the device more expensive to operate and increases the likelihood of mechanical breakdown.

SUMMARY OF THE INVENTION

In a principal aspect, the present invention is an improved apparatus for both washing and drying an automotive vehicle. The apparatus includes a pair of tracks and a gantry that moves along the tracks. The apparatus further includes a water outlet, brush, blower, nozzle, and oscillator, all mounted on the gantry.

The gantry includes two upwardly extending support structures and a cross-over beam between them. The water outlet wets the vehicle and the brush sweeps against the vehicle to wash it. The blower expells air to dry the vehicle. The nozzle is attached to the blower, however, and defines an orientation. Furthermore, the nozzle directs the air expelled by the blower in a direction generally parallel to the orientation.

In addition, the oscillator is interconnected to each of the blowers. The oscillator changes the orientation of the nozzle. As a result, the drying air is directed to the vehicle from changing directions.

Accordingly, an object of the present invention is an improved vehicle wash and dryer. Another object is a unitary vehicle wash and dryer that more efficiently drys a vehicle after it has been washed, automatically drying the vehicle for a proper amount of time. An additional object is a vehicle wash and dryer that may operate on a smaller floor space. Still another object is a vehicle wash and dryer that is smaller, less complex, and less expensive to manufacture.

Yet another object of the present invention is a vehicle wash and dryer that substantially avoids the use of baffles or other obstructions in proximity to the vehicle being washed. An additional object is a vehicle wash and dryer that will accommodate a larger vehicle and that is less likely to damage itself or the vehicle while operating.

Yet another object of the present invention is a vehicle wash and dryer that is less subject to mechanical breakdown. A further object is a vehicle wash and dryer that uses less electrical energy and that is thus less expensive to operate.

These and other objects, features, and advantages of the present invention are discussed or apparent in the following detailed description.

BRIEF DESCRIPTION OF THE DRAWING

The preferred embodiment of the present invention is described herein with reference to the drawing wherein.

DETAILED DESCRIPTION OF THE PREFERRED EMBODIMENT

Figure 1:
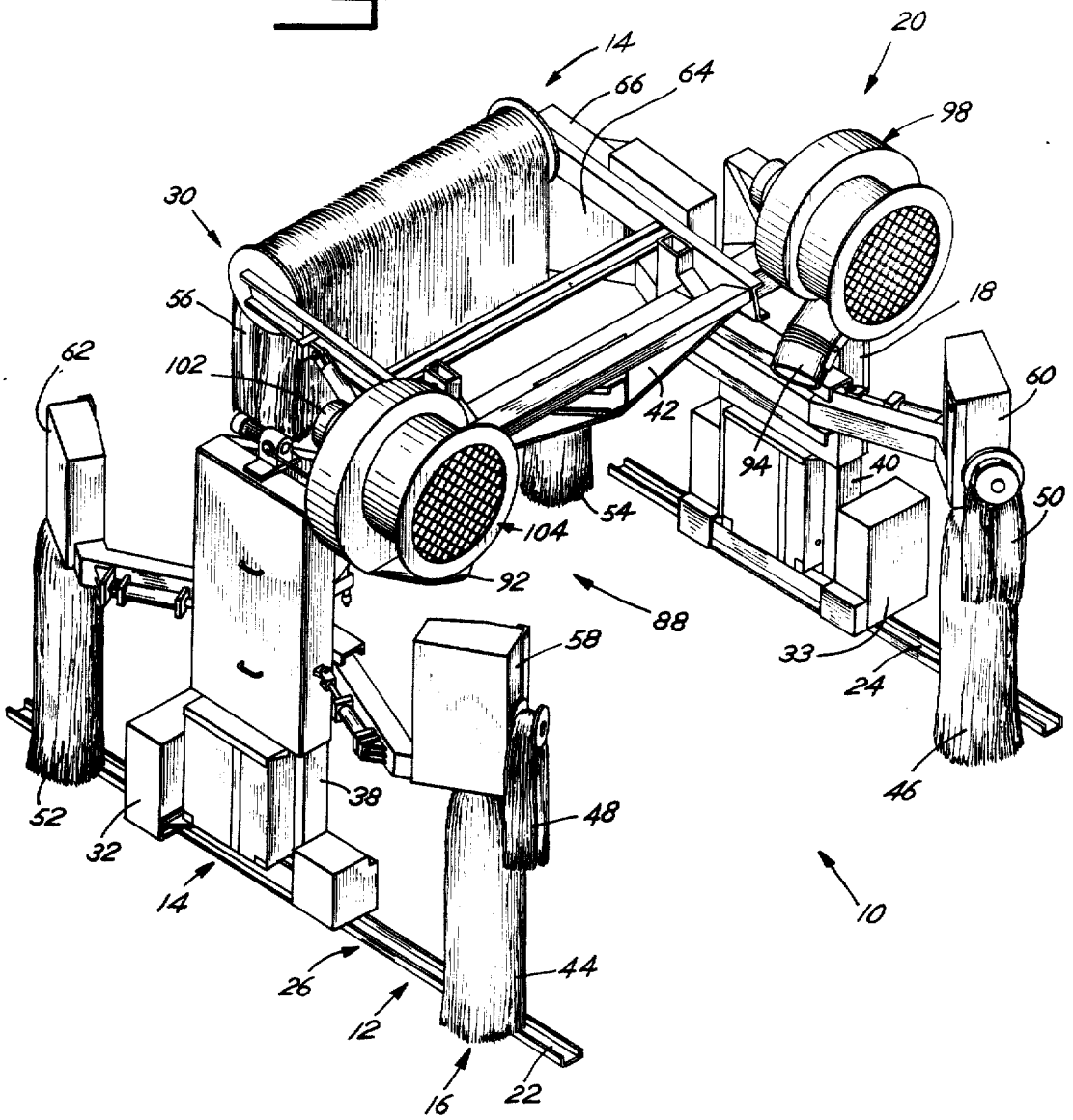
FIG. 1 is a left front isometric view of the preferred embodiment of the present invention.

Referring to FIGS. 1–5, the preferred embodiment of the present invention is shown as an improved vehicle wash and dryer apparatus 10. The apparatus 10 includes a pair of tracks 12, gantry 14, washing assembly 16, controller 18, and drying assembly 20.

Figure 3:
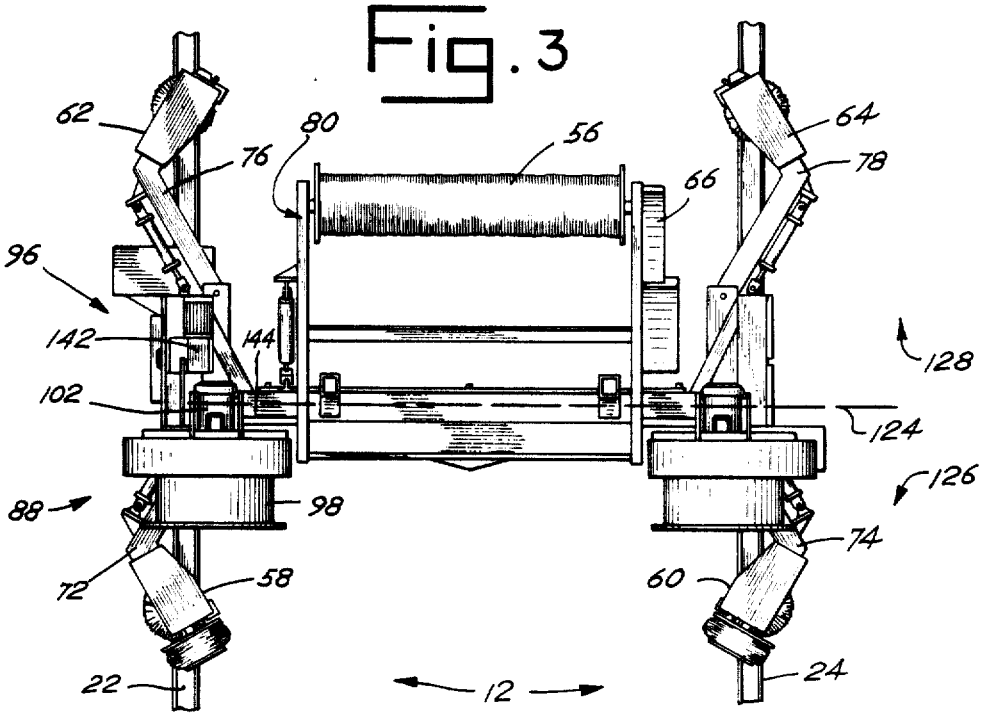
FIG. 3 is a top plan view of the preferred embodiment shown in FIG. 1.
Figure 4:
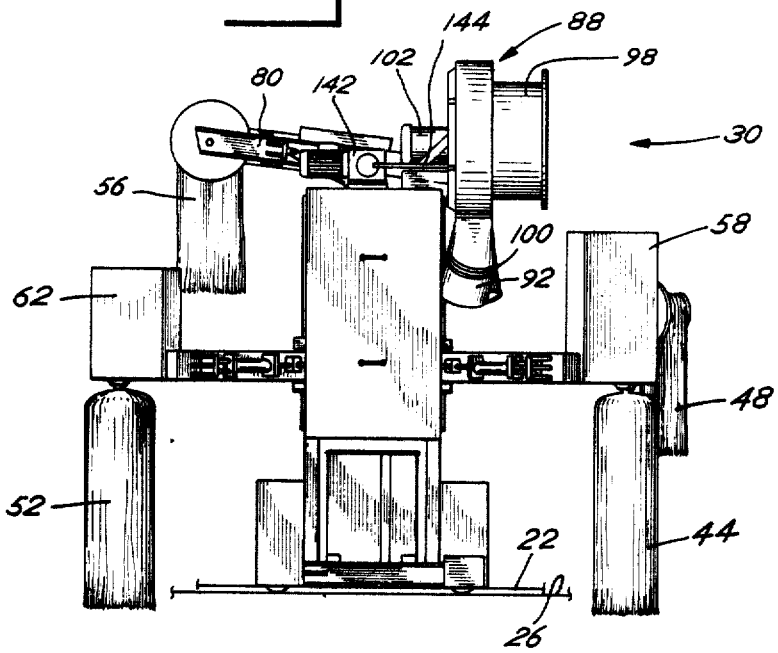
FIG. 4 is a left side view of the preferred embodiment shown in FIG. 1.

As shown in FIGS. 3 and 4, the tracks 12 include two rails 22, 24 mounted to the floor 26. The rails 22, 24 are substantially parallel to each other, spaced approximately 10 feet apart. Each of the rails 22, 24 is about 25 feet long.

The gantry 14 includes a roller assembly 28, superstructure 30, and two electric drive motors 32, 33. See FIGS. 1 and 5. The roller assembly 28 includes two pairs of rollers 34, 36, each of which rides over one of the rails 22, 24. The superstructure 30 rides on the roller assembly 28.

As shown in FIG. 1, The superstructure 30 includes two substantially upwardly extending support structures 38, 40 and a cross-over beam 42 therebetween. Each of the two support structures 38, 40 is positioned above one of the pairs of rollers 34, 36, which, in turn, is over one of the rails 22, 24. The structures 38, 40 lie about 10 feet apart and the cross-over beam 42 is positioned approximately seven feet above the floor 26.

Each of the motors 32, 33 is affixed to one of the structures 38, 40. The motors 32, 33 each deliver up to ½ horsepower and power and superstructure 30 and roller assembly 28 along the rails 22, 24 of the track assembly 12. As with all electric motors on the apparatus (except the fan motors) the motors 32, 33 are each interconnected to a gear reducer (not shown).

As shown in FIGS. 1 and 3, the washing assembly 16 includes a series of seven brushes 44, 46, 48, 50, 52, 54, 56 powered by five one-horsepower electric motors 58, 60, 62, 64, 66. The brushes 44–56 and motors 58–66 are interconnected to the superstructure 30 via retracting arms 72, 74, 76, 78, 80.

A series of water outlets 84 are also mounted on the superstructure 30. See FIG. 2. The water outlets 84 are interconnected to a pressurized supply of water (not shown). As will be recognized by those of ordinary skill in the art, the controller 18 sequences the activity of the gantry 14, washing assembly 16, and drying assembly 20.

Thus, a vehicle (not shown) may be parked between the two rails 22, 24. Thereafter, the controller 18 may be activated, putting the apparatus 10 in a "wash mode" and causing the electric motors 58066 to spin the brushes 44–56 and the water outlets 84 to spray water.

Thereafter, the motors 32, 33 drive the gantry 14 along the tracks 12 at a speed of approximately 8 inches per second. The gantry 14, brushes 44–56, and water outlets 84 consequently pass over the vehicle, washing it.

The controller 18 senses when the gantry 14 has reached the end of the vehicle while in the wash mode. The controller 18 then reverses the direction of the gantry 14, so that is passes back over the vehicle. The controller 18 may then cause the gantry 14 to pass over the vehicle two or more times, in order to more thoroughly wash the vehicle or to rinse off any soap residue on the vehicle.

Upon completing the wash mode, the controller 18 turns off the water outlets 84, electric motors 58–66, and brushes 44–54. Air is blown through the water outlets 84 to reduce the amount of water that they will drip onto the vehicle. In addition, the brush 56 is rotated to fling water out of it and thus reduce the amount of water that may drip from the brush 56 onto the vehicle. Thereafter, the drying assembly 20 is started, and the gantry 14 again passes two or more times over the vehicle.

The motors 32, 33 drive the gantry 14 at a speed of about four inches per second, in order to fully dry the vehicle. Speeds of between 2 and 10 inches per second, however, will also allow the apparatus 10 to function adequately.

Figure 2:
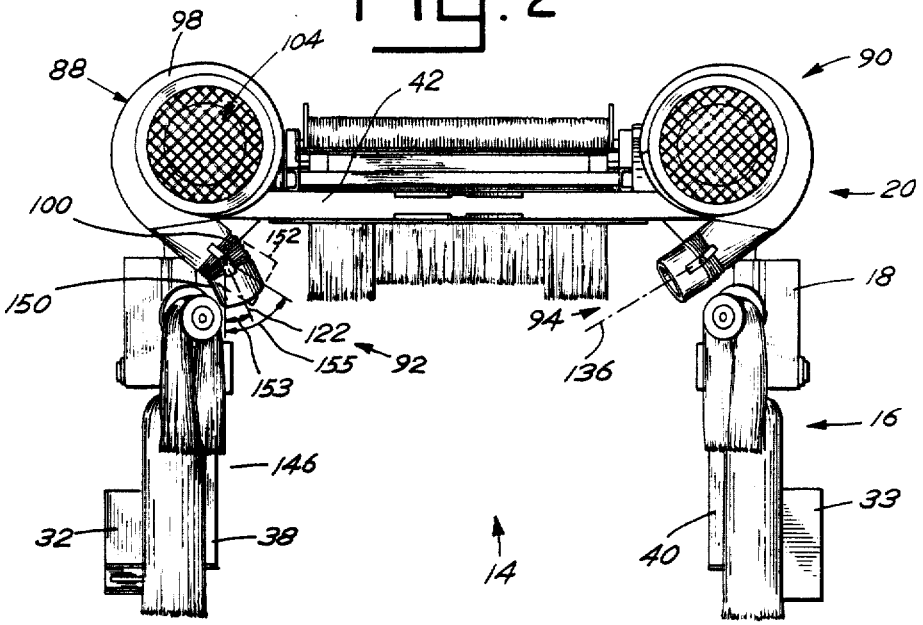
FIG. 2 is a front elevational view of the preferred embodiment shown in FIG. 1.

As shown in FIGS. 2 and 3, the drying assembly 20 includes first and second blowers 88, 90, first and second nozzles 92, 94, and an oscillator 96 interconnected to the two nozzles 92, 94.

Since the first and second blowers 88, 90 are substantially similar, only the first blower 88 is discussed for illustrative purposes. The blower 88 includes a housing 98, flexible coupling 100, and an electric motor 102 driving a twelve-bladed fan 104. The fan 104 is approximately 2 feet in diameter and is enclossoed by the housing 98.

When the motor 102 is running, the blower 88 will displace approximately 5,000 cubic feet of air per minute (cfm) at a velocity of approximately 10,000 feet per minute. Other blowers, with displacements of between 2500 and 9000 cfm will also work adequately with the present invention. Applicant has found, however, that the blower 88, with a displacement of 5000 cfm, is best for quickly drying the vehicle without using an inordinate amount of electrical power.

The motor 102 and housing 98 are affixed to the cross-over beam 42, substantially above the structure 38. The housing 98 itself is substantially adjacent to both the structure 38 and cross-over beam 42. Thus, the drying assembly 20 is mounted on the same superstructure 30 as the washing assembly 16. This allows the vehicle wash and drying apparatus 10 to occupy the same space as a normal vehicle wash (without a dryer) would require).

The air displaced by the blower 88 is directed through the flexible housing 100 and nozzle 92. The flexible housing 100 has an inside diameter of approximately 11 inches. The nozzle 92 includes first and second ends 118, 120 and a longitudinal axis 122 therebetween. This longitudinal axis 122 defines the orientation of the nozzle 92.

The first end 118 is directly connected to the flexible coupling 100 and defines an inside diameter of approximately 10¾ inches. The second end 120 is less than two feet from both the support structure 38 and the cross-over beam 42 and has an inside diameter of about 10¼ inches. Because the nozzle 92 is "tucked in" close to the support structure 38 and cross-over beam 42, the area underneath the superstructure 30 for a vehicle is substantially unobstructed. Thus, it is much less likely that a vehicle will collide with the nozzle 92 or flexible coupling 100.

Figure 5:
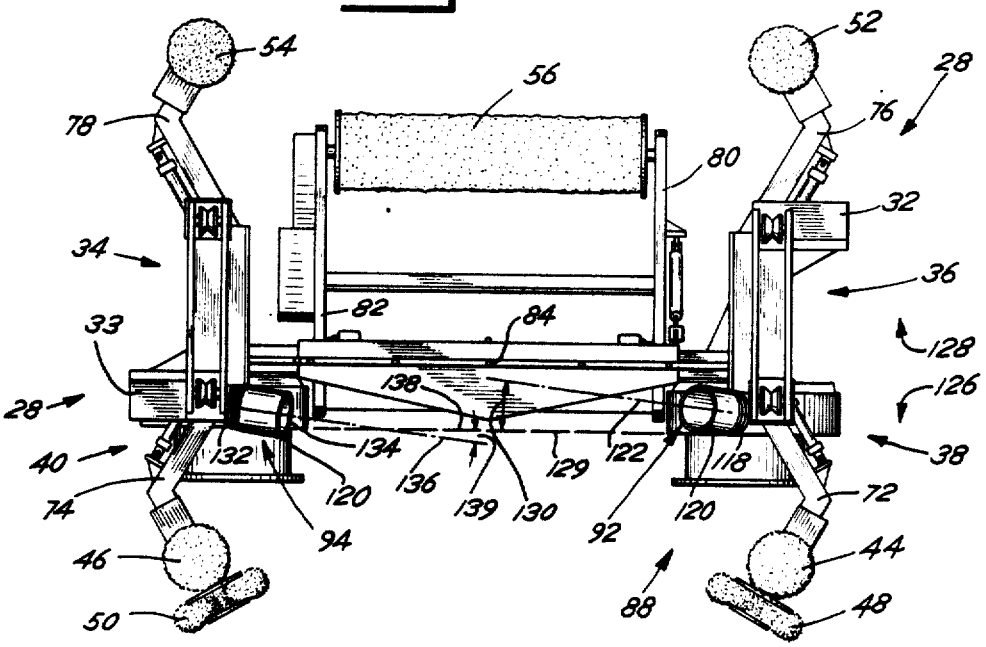
FIG. 5 is a bottom plan view of the superstructure of the preferred embodiment shown in FIG. 1.

As shown in FIGS. 3 and 5, the cross-over beam 42 defines a cross-over axis 124 that is substantially orthogonal to either of the two rails 22, 24. The cross-over axis 124 divides the apparatus 10 into entry and exit sections 126, 128. The longitudinal axis 122 of the nozzle 92 and a line 129 parallel to the cross-over axis 124 cooperatively define an angle 130 of approximately 8°. Thus, the orientation (longitudinal axis 122) of the nozzle 92 points toward the exit section 128 of the apparatus 10, rather than pointing directly across toward the second nozzle 94. Thus, the first nozzle 92 left is oriented toward the exit 126 of the apparatus 10 at an angle of 8°.

Similarly, the second nozzle 94 includes first and second ends 132, 134 which have the same proportions as the first and second ends 118, 120 of the first nozzle 92. The first and second ends 132, 134 of the second nozzle 94 also define a longitudinal axis 136 or orientation for the second nozzle 94. The longitudinal axis 136 and a line 138 parallel to the cross-over axis 124 accordingly form an angle 139 of 8°. Thus, the second nozzle 94 is oriented toward the entrance section 126 of the apparatus 10 at an angle of approximately 8°.

Because one of the nozzles 92, 94 is oriented to the exit section 126 and the other toward the entrance section 128, the two blowers 88, 90 do not blow directly at each other. As a result, applicant has discovered that each of the blowers 88, 90 is more efficient in drying the vehicle. The blowers 88, 90 do not each blow water toward the middle of the vehicle, where it will stay. Rather, each blower, unimpeded by the other, may blow water off the vehicle.

In the preferred embodiment, applicant has set the nozzles 92, 94 at angles of 8° from the cross-over axis 124. Other angles, between 2° and 20°, will also be fairly effective with the present invention.

Of course, other embodiments of the present invention could also position each of the nozzles 92, 94 directly parallel to the cross-over axis, provided that the blowers were "off-set" from one another. Thus, the first blower 88 might be positioned in the entry section 126 of the apparatus 10 and the second blower might be positioned in the exit section 128 of the apparatus 10. Thus, the blowers 89, 90 would not blow air directly at each other.

As shown in FIG. 3, the oscillator 96 of the preferred embodiment is mounted on the superstructure 30 and is interconnected to the two nozzles 92, 94. The oscillator 96 includes a ⅓ horsepower electric motor 142 and linkage 144.

The motor 142 and linkage 144 move each of the nozzles 92, 94 up and down. Since the arc followed by the two nozzles 92, 94 is substantially similar, only the movement of the first nozzle 92 is described for illustrative purposes.

As shown in FIG. 2, the oscillator 96 moves the nozzle 92 between lower and upper positions 150, 152. In the lower position 150, the longitudinal axis 122 of the nozzle 92 defines an angle 153 of 25° with a substantially vertical axis 146. In the upper position 152, the longitudinal axis 122 of the nozzle 92 defines an angle 155 of 60° with the vertical axis 146. Thus, the nozzle 92 moves through an arc (between the upper and lower positions 150, 152) of 35°.

The arc travelled by the longitudinal axis 122 need not precisely vary from 25° to 60°. An arc between 0° and 90° or between 40° and 60°, for example, would also work adequately to dry most vehicles.

The oscillator 96 moves the nozzle 92 from the lower position 150 to the upper position 152, and back to the lower position 150 in a period of about 3 seconds. A period of oscillation of between 1 and 9 seconds will also work adequately with the present invention.

Importantly, the nozzles 92, 94 both do not reach the upper position or lower position at the same time. Again, to help keep the blowers 88, 90 from "working against" or "blowing into" each other, the nozzles 92, 94 are synchronized to oscillate approximately 180° out of phase with each other. Thus, for example, when one nozzle is in the lower position and starting to move upward, the other nozzle is in the upper position and starting to move downward. Consequently, the two blowers 88, 90 are able to dry the top of the vehicle quite well.

The configuration of the blowers 88, 90 in the present invention offers substantial advantages. The blowers are not aimed directly at each other, but, rather, oscillator over the sides and top of the vehicle. Consequently, the apparatus may fully dry a vehicle with only two blowers. Significantly, the apparatus is relatively compact, less prone to mechanical breakdown, and uses less electrical energy for operation.

A single preferred embodiment of the present invention has been described herein. It is to be understood, however, that changes and modifications can be made without departing from the true scope and spirit of the present invention. This true scope and spirit are defined by the following claims, to be interpreted in light of the foregoing specification.

I claim:

[1. An apparatus for washing and drying an automotive vehicle comprising, in combination:

a gantry for moving along said vehicle;

water outlet means, mounted on said gantry, for wetting said vehicle;

dryer means, mounted on said gantry, for expelling air and removing moisture from said vehicle;

at least two nozzles on said dryer means, each of said nozzles defining an orientation and directing said air from said dryer means in a direction substantially parallel with said orientation; and oscillation means, interconnected to said nozzles, for moving said orientation of each of two said nozzles to upper and lower positions and thereby moving said direction of said air from said dryer means, whereby air is directed to said vehicle to substantially dry the sides and top of said vehicle.]

2. An apparatus for washing and drying an automotive vehicle comprising, in combination:

a gantry for moving along said vehicle, [sand] *said* gantry separating said apparatus into entry and exit sections;

water outlet means, mounted on said gantry, for wetting said vehicle;

[two blowers] *dryer means*, mounted on said gantry, for expelling air;

[a nozzle] *at least two nozzles* on [each of said blowers] *said dryer means*, each of said nozzles defining an orientation and directing air from [one of said blowers] *said dryer means* in a direction substantially parallel with said orientation, one of said nozzles oriented toward said entry section of said apparatus and another of said nozzles oriented toward said exit section of said apparatus; and oscillation means, interconnected to both of said nozzles, for changing said orientation of each of said nozzles and thereby changing said direction of said air from [each of] said [blowers] *dryer means*, whereby air is directed by each of said nozzles toward said vehicle from changing directions in order to substantially dry the sides and top of said vehicle.

3. An apparatus as claimed in claim 2 wherein one of said nozzles is oriented more than 2° and less than 20° toward said entry section and said other nozzle is oriented more than 2° and less than 20° toward said exit section.

[4. An apparatus as claimed in claim 2 further comprising at least one brush, mounted on said gantry, for wiping said vehicle.]

5. An apparatus as claimed in claim 2 wherein said gantry defines a lower region, for substantially receiving said vehicle, and an upper region, said blowers being mounted on said gantry substantially in said upper region, whereby said lower region, substantially reserved for said vehicle, is unobstructed by said blowers.

6. An apparatus as claimed in claim 2 wherein each of said nozzles may oscillate to an upper position and lower position and said nozzles reach said upper positions at different times.

7. An apparatus as claimed in claim 6 wherein said oscillation means oscillates one of said nozzles to reach said upper position and substantially simultaneously oscillates another of said nozzles to reach said lower position.

8. An apparatus as claimed in claim 6 wherein said oscillation means moves said orientation of said nozzle through an arc of at least 20°.

9. An apparatus as claimed in claim 8 wherein said oscillation means moves said orientation of said nozzle through said arc at a substantially regular interval, said regular interval being more than 1 second and less than 9 seconds.

10. An apparatus as claimed in claim 9 further comprising motor means for propelling said gantry at a speed less than 10 inches per second.

11. An apparatus as claimed in claim 10 wherein each of said blowers expels at least 2,500 cubic feet of air per minute.

* * * * *